(12) United States Patent
Söhner

(10) Patent No.: US 6,744,167 B2
(45) Date of Patent: Jun. 1, 2004

(54) ROTOR OF A TURBOGENERATOR

(75) Inventor: Walter Söhner, Karlsruhe (DE)

(73) Assignee: Alstom (Switzerland) Ltd, Baden (CH)

( * ) Notice: Subject to any disclaimer, the term of this patent is extended or adjusted under 35 U.S.C. 154(b) by 74 days.

(21) Appl. No.: 10/127,617

(22) Filed: Apr. 22, 2002

(65) Prior Publication Data

US 2002/0190597 A1 Dec. 19, 2002

(30) Foreign Application Priority Data

Apr. 21, 2001 (DE) .......................... 101 19 593

(51) Int. Cl.[7] ................................ H02K 3/48
(52) U.S. Cl. ................ 310/214; 310/215; 310/196
(58) Field of Search ............... 310/214, 215, 310/216, 201, 196, 195

(56) References Cited

U.S. PATENT DOCUMENTS

| 4,163,166 | A | * | 7/1979 | Kamiya et al. | 310/215 |
| 4,200,818 | A | * | 4/1980 | Ruffing et al. | 310/214 |
| 4,333,027 | A | * | 6/1982 | Madsen | 310/61 |
| 4,633,574 | A | * | 1/1987 | Bath et al. | 29/596 |
| 4,774,429 | A | * | 9/1988 | Ueda | 310/214 |
| 5,030,870 | A | * | 7/1991 | Wichmann | 310/215 |
| 5,365,135 | A | * | 11/1994 | Konrad et al. | 310/214 |
| 5,430,340 | A | * | 7/1995 | Shih et al. | 310/214 |
| 5,477,095 | A | * | 12/1995 | Kleinburger et al. | 310/215 |
| 5,528,097 | A | * | 6/1996 | Gardner et al. | 310/270 |
| 5,598,049 | A | * | 1/1997 | Meier | 310/214 |
| 6,265,805 | B1 | * | 7/2001 | Debleser | 310/261 |

FOREIGN PATENT DOCUMENTS

| DE | 1 012 362 | 7/1957 |
| EP | 0 952 655 A2 | 10/1999 |

* cited by examiner

Primary Examiner—Nicholas Ponomarenko
Assistant Examiner—Leda Pham
(74) Attorney, Agent, or Firm—Russell W. Warnock

(57) ABSTRACT

The invention relates to a rotor (1) for a turbogenerator having a field winding (4) which is formed from hollow conductors (3), having a damper bar (8), having insulation (9) arranged between the damper bar and the field winding, having a wedge (15) and having a gas outlet zone (5) which is located in the central rotor region. In order to reduce the distance between the field winding and the wedge, provision is made for the damper bar to be interrupted and to be replaced by an insulating piece (10) in the gas outlet zone (5), and for the damper bar parts (8) to be electrically conductively bridged by the wedge (15).

8 Claims, 2 Drawing Sheets

ROTOR OF A TURBOGENERATOR

BACKGROUND OF THE INVENTION

Field of the Invention

The invention relates to a rotor for a turbogenerator.

In a generally known rotor such as this, insulation is used to ensure that the necessary creepage distances are complied with in the gas outlet zone. The thickness of the insulation between the damper winding and the field winding depends on the physical configuration of the winding bars, and on the required creepage distances in the gas outlet zone.

The insulation is generally formed with a constant wall thickness over the entire slot length.

If a specific slot depth is specified, as is the case in particular with replacement windings for rotors which are already in use, then the insulation between the damping winding and the field winding can lead to a reduction in the space available for the field winding in order to maintain a height which is resistant to creepage currents, as a result of which both the copper cross section and any gas channel which may be present are constrained for each conductor. If the rated field current is maintained or is increased, then considerably more winding heating occurs, while the gas flow rate is reduced at the same time.

SUMMARY OF THE INVENTION

This results in the object of specifying a rotor of the type mentioned initially in which the distance between the field winding and the damper winding is minimal, despite complying with the required creepage distances.

According to the invention, this object is achieved by a rotor for a turbogenerator having a field winding which is formed from hollow conductors, having a damper bar, having insulation arranged between the damper bar and the field winding, having a wedge and having a gas outlet zone which is located in the central rotor region, in that the damper bar is interrupted and is replaced in the region of the gas outlet zone by an insulating piece, and in that the parts of the damper bar are electrically conductively bridged by the wedge.

It is thus possible to achieve the desired number of conductors, each having the same overall cross-sectional area (copper cross section and gas channel cross section) for a specified slot depth, irrespective of whether this relates to a replacement winding or a new winding. The novel solution makes it possible to advantageously use continuous copper hollow conductors to replace field winding bars which are designed with hollow conductors and with interrupted flat copper in the region of the gas outlets, with the original wedge and damper bar height (with insulation) being maintained, so that the same rotor slot cross-sectional area and the same external contour are available for accommodation of the field winding as for the original winding.

Furthermore, the original wedges and the original damper conductors can still be used, after minor modifications.

According to one preferred refinement, a bridge wedge which is composed of electrically highly conductive material engages over an insulating piece which is fitted in the region of the gas outlet in order to form a creepage distance, as well as in each case one subregion of the adjacent damper bar parts on both sides of the insulating piece. The remaining wedge pieces, which engage over the damper bar parts in those regions where there is no gas outlet, may be composed of electrically less highly conductive material. In order to improve the electrical contact, an electrically conductive wedge attachment is arranged between the wedge and the damper bar parts, as well as the insulating piece. Securing elements are provided between the wedge and damper bar parts, in order to prevent relative movement.

The rotor according to the invention will be described with reference to an exemplary embodiment and the schematic FIGS. 1 and 2.

DESCRIPTION OF THE PREFERRED EMBODIMENTS

Figure 1:
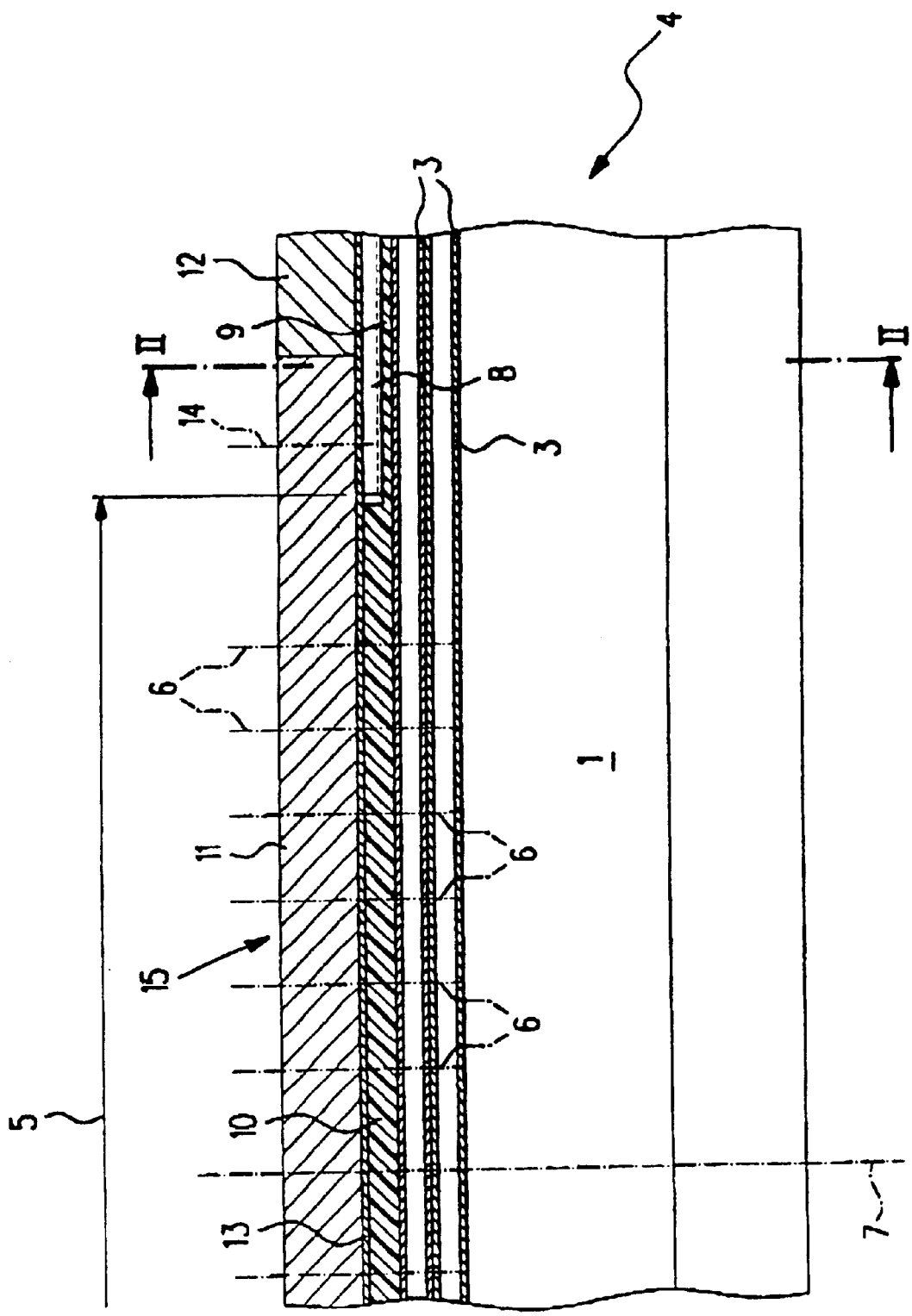
FIG. 1 shows a longitudinal section through the subregion of a rotor.
Figure 2:
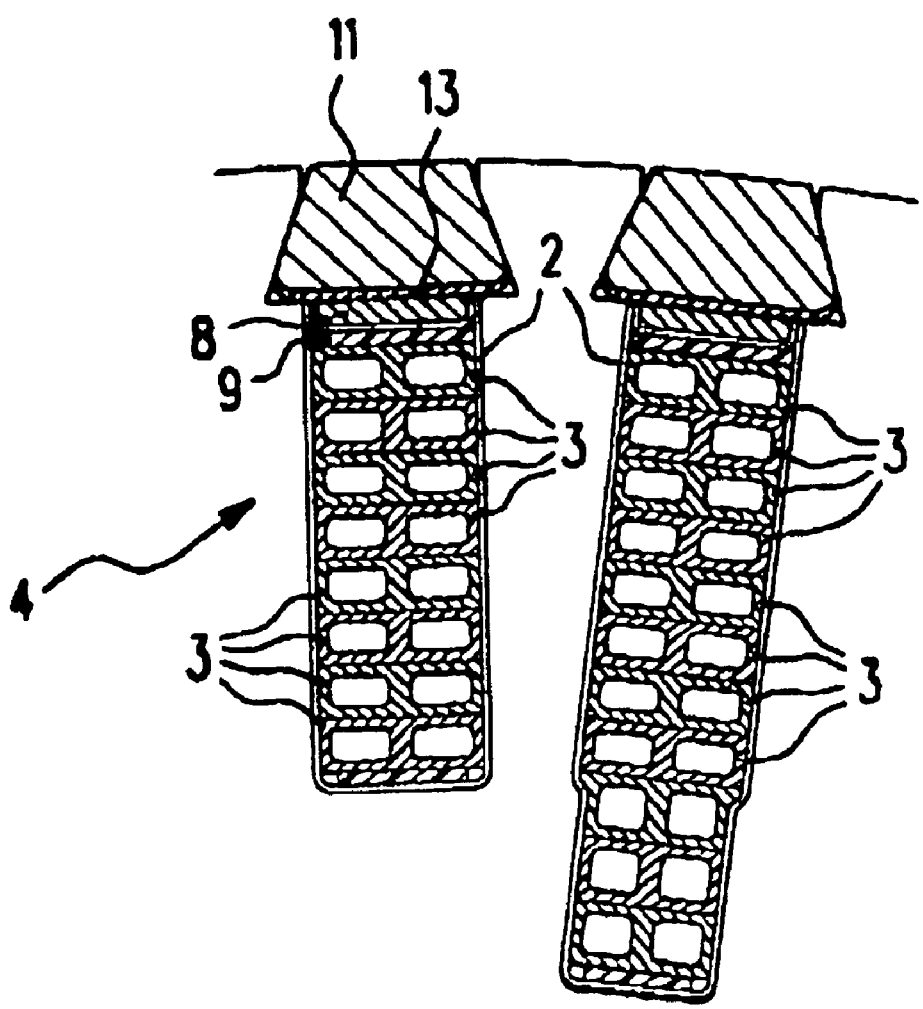
FIG. 2 shows a section along the line II—II in FIG. 1.

FIGS. 1 and 2 show subregions of a rotor 1 for a turbogenerator, which is not illustrated any further. A number of hollow conductors 3 can be seen in a slot 2, forming a field winding 4. A gas outlet zone 5 ensures that the cooling gas, which flows through the cavities in the hollow conductors 3, emerges from the rotor via radial holes 6. The line 7 symbolizes the center of the rotor 1 in the longitudinal direction.

A portion of the damper bar 8 extends from the end-face start of the respective slot 2 to approximately the start of the gas outlet zone 5. Insulation 9, which is arranged between the field winding 4 and the damper bar 8 and is matched to the slot width, extends to the same extent. An insulating piece 10, which is likewise matched to the slot width and whose height corresponds to the sum of the height of a damper bar 8 and the height of the insulation 9, extends between those parts of the damper bar 8 which are provided at both ends of the rotor 1. The height of the insulating piece 10 ensures compliance with the necessary creepage distance in the gas outlet zone 5. Since the creepage current problem exists only in the gas outlet zone 5, an insulation layer with little height is sufficient in the region of the damper bar 8.

A bridge wedge 11, which is composed of electrically highly conductive material, engages over the insulating piece 10 and over a subregion of the respective damper bar 8 facing the insulating piece 10. Wedge pieces 12, which engage over each of the regions of the damper bars 8 which point outward, are composed of electrically less highly conductive material. A wedge attachment 13, which is formed from a copper strip, is arranged between the wedge pieces 12, which form the entire wedge 15, and the bridge wedge 11 as well as between the damper bar 8 and the insulating piece 10. During operation, the centrifugal forces result in the two damper bar parts 8 being pressed against the lower face of the bridge wedge 11 and of the wedge piece 12. This has an advantageous effect on the contact characteristics. In order to improve the contact characteristics, the overlapping distance between the bridging wedge 11 and the damper bar 8 can be lengthened.

14 indicates a grubscrew which prevents the damper bar 8 from shifting with respect to the bridging wedge 11.

I claim:

1. A rotor for a turbo generator, comprising:

a front end and a rear end;

a field winding formed from hollow conductors;

a damper bar including parts respectively disposed at said front end and said rear end;

insulation disposed between said damper bar and said field winding;

a central rotor region defined between said parts of said damper bar;

a gas outlet zone disposed in said central rotor region;

an insulating piece, said damper bar being interrupted and replaced in a region of said gas outlet zone by said insulating piece; and a wedge, said parts of said damper bar being electrically conductively bridged by said wedge.

2. The rotor according to claim 1, wherein:

said damper bar has an edge region;

said wedge is formed from a bridge wedge and further wedge pieces;

said bridge wedge engages over said insulating piece and over a region of said damper bar facing said insulating piece; and each said further wedge pieces is associated with said edge region of said damper bar.

3. The rotor according to claim 1, including a strip-shaped wedge attachment of copper disposed between said wedge, said damper bar, and said insulating piece.

4. The rotor according to claim 1, including securing elements disposed between said wedge and said damper bar to prevent relative movement.

5. A rotor for a turbogenerator, comprising:

a field winding having hollow conductors;

a damper bar having interruption;

insulation disposed between said damper bar and said field winding;

a central rotor region;

a gas outlet zone disposed in said central rotor region;

a wedge electrically conductively bridging parts of said damper bar; and an insulating piece replacing said interruptions of said damper bar in a region of said gas outlet zone.

6. The rotor according to claim 5, wherein:

said damper bar has an edge region;

said wedge has a bridge wedge and further wedge pieces;

said bridge wedge engages over said insulating piece and over a region of said damper bar facing said insulating piece; and each of said further wedge pieces is associated with said edge region of said damper bar.

7. The rotor according to claim 5, including a strip-shaped copper wedge attachment disposed between said wedge, said damper bar, and said insulating piece.

8. The rotor according to claim 5, including securing elements disposed between said wedge and said damper bar to prevent relative movement.

* * * * *